United States Patent [19]

Sandstrom

[11] Patent Number: 4,809,601

[45] Date of Patent: Mar. 7, 1989

[54] PIPE HANGER STRAP

[76] Inventor: Wayne R. Sandstrom, Box 2414, Fairbanks, Ak. 99701

[21] Appl. No.: 100,202

[22] Filed: Sep. 23, 1987

[51] Int. Cl.[4] .................................................. F16L 3/00
[52] U.S. Cl. ........................................ 248/58; 248/62; 248/297.2
[58] Field of Search ............... 248/58, 62, 60, 59, 248/297.2, 903, 340, 214; 411/122-124

[56] References Cited

U.S. PATENT DOCUMENTS

| | | | |
|---|---|---|---|
| 966,945 | 8/1910 | McGee .............................. | 411/123 |
| 1,512,551 | 10/1924 | McDonald ....................... | 411/124 X |
| 1,579,418 | 4/1926 | Tomkinson ...................... | 248/62 X |
| 2,324,181 | 7/1943 | Tulien .............................. | 248/62 X |
| 2,616,645 | 11/1952 | Kindorf et al. ................. | 248/62 |
| 2,714,497 | 8/1955 | Denis ............................... | 248/62 |
| 2,944,778 | 7/1960 | Katis ................................ | 248/62 |
| 3,261,580 | 7/1966 | Schauster ........................ | 248/62 |
| 3,848,844 | 11/1974 | Barrett ............................ | 248/297.2 X |

FOREIGN PATENT DOCUMENTS

| | | | |
|---|---|---|---|
| 1211867 | 3/1966 | Fed. Rep. of Germany ....... | 248/60 |
| 1650264 | 8/1970 | Fed. Rep. of Germany ....... | 248/60 |
| 2029197 | 3/1980 | United Kingdom ............... | 248/297.2 |

Primary Examiner—Ramon O. Ramirez
Attorney, Agent, or Firm—Bacon & Thomas

[57] ABSTRACT

A pipe hanger is disclosed in which an elongated strap member has a base portion with first and second ends and lateral edge portions having a thickness greater than that of the base portion. The first and second end portions overlap each other and a device to attach the pipe hanger to a support structure passes through the overlapped end portions. The increased thickness lateral edge portions define both a central gap between them and laterally extending slots which communicate with the central gap. A bracing support bracket may be slidably retained in the lateral slots by flanges which engage the slot such that the position of the bracket on the pipe hanger may be adjusted at the installation site. The end portions may also have a first and second part in which the second part is folded over onto the first part to provide additional reinforcing at the attachment point.

27 Claims, 4 Drawing Sheets

PIPE HANGER STRAP

BACKGROUND OF THE INVENTION

The present invention relates to a pipe hanger strap for supporting a pipe from a support structure. The pipe hanger has increased strength and may accommodate additional mounting brackets or other accessories.

Known pipe hangers typically comprise an elongated strap which passes under a pipe and has its ends attached to a support structure. Such straps have a relatively small thickness and lateral dimension in comparison with their lengths. The relatively small thickness and lateral dimensions limits the ultimate weight capable of being supported by the hanger. The accepted ways of increasing the capacity of the hanger have been to increase the thickness or the lateral dimension, or to utilize more exotic materials to fabricate the hanger. All of these possibilities increase the expense of manufacturing and using the pipe hangers.

It is often necessary to attach a bracket extending from a side of the pipe hanger to an adjacent structure to provide the necessary rigidity to the piping system. Typically the precise location of such brackets on the side of the pipe hanger cannot be ascertained until the actual installation of the hanger at the piping site. Such brackets must usually be attached to the pipe hanger by bolts or by welding, both of which serve to increase the complexity of the pipe hanging operation and to increase the time involved.

SUMMARY OF THE INVENTION

The present invention relates to a pipe hanger wherein an elongated strap member has a base portion with first and second end portions and lateral edge portions having a thickness greater than that of the base portion. The first and second end portions overlap each other and means to attach the pipe hanger to a support structure passes through the overlapped end portions.

The increased thickness lateral edge portions define a central gap between them and a laterally extending slot which communicates with this central gap. A bracing support bracket may be slidably retained in the lateral slots by flanges which engage the slot such that the position of the bracket on the pipe hanger may be adjusted at the installation site.

The increased thickness edge portions serve to maximize the strength of the hanger for a given lateral dimension and a thickness, while the overlapped end portions provide reinforcement for the attaching means.

The end portions each may comprise a first and second part wherein the second part is folded over onto the first part to provide additional reinforcing at the attachment point. The overlapping end portions then comprise approximately four thicknesses of the hanger member to increase the supporting strength of the member without substantially increasing its dimensions.

The attaching means may comprise a bolt and nut assembly adapted to be secured to a support structure wherein the bolt passes through the overlapped end portions and is retained thereon by a nut. Nut locking means may be inserted into the laterally extending slots and may be manually deformed after installation to bear against a flat of the nut so as to prevent inadvertent rotation of the nut with respect to the hanger.

The increased thickness lateral edge portions may be formed by folding over edges of the elongated strap member onto the base portion. One or more lateral bracing brackets may be placed in the laterally extending slots at the installation site prior to deforming the end portions into their overlapping relationship.

DETAILED DESCRIPTION OF THE PREFERRED EMBODIMENTS

Figure 1:
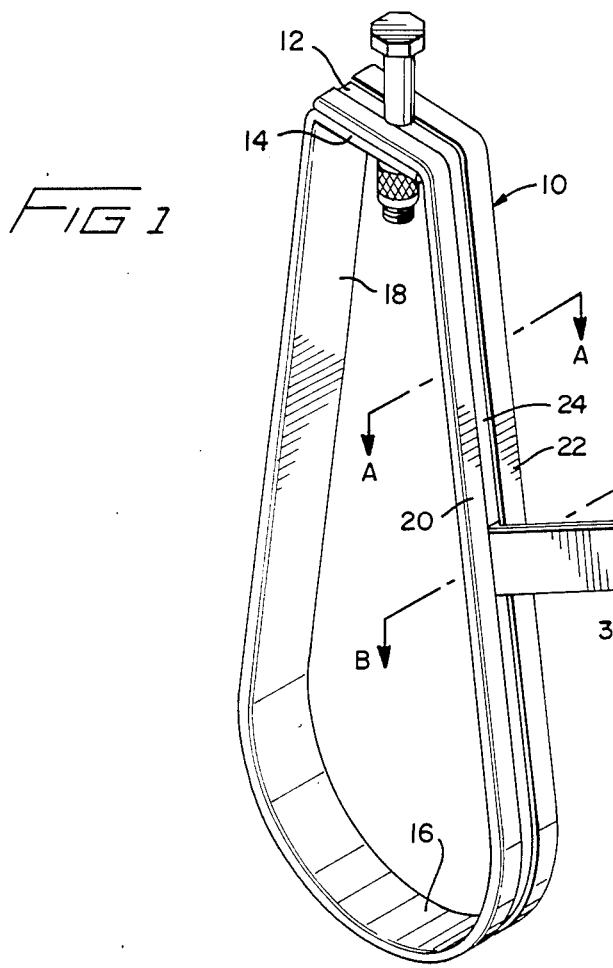
FIG. 1 is a perspective view of the pipe hanger strap according to the invention.

As illustrated in FIG. 1, the pipe hanger according to the invention comprises elongated strap member 10 having overlapping end portions 12 and 14. Elongated strap member 10 with overlapping end portions 12 and 14 forms a closed member which passes under a pipe (not shown) which is supported on lower, curved portion 16. Curved portion 16 passes under the pipe to be supported and the overlapping end portions 12 and 14 are attached to a support structure.

The elongated strap member 10 has a base portion 18 having a thickness of $t_1$ and lateral edge portions 20 and 22 each of which has a thickness of $t_2$ such that $t_2 > t_1$.

The elongated strap member 10 may be formed from a single elongated element by folding over the lateral edges onto the base portion so as to leave a central gap 24 between the folded over edges. The lateral edge portions 20 and 22 define laterally extending slots 26 and 28 which may extend substantially over the length of the elongated strap member or over only a small portion thereof. Each of the lateral slots 26 and 28 extends from and communicates with the central gap 24.

It is often times necessary to secure the pipe hanger against lateral movement by attaching a bracket between a side of the hanger and an adjacent structure. The bracket 30 defining mounting hole 32 has one or more laterally extending flanges 34 and 36 which are dimensioned so as to be slidably received within lateral slots 26 and 28, respectively. The sliding engagement of the flanges 34 and 36 in slots 26 and 28 allows the vertical position of bracket 30 to be adjusted at the installation site, while at the same time provides the necessary rigidity against lateral forces acting on the hanger. Although one such bracket 30 is shown, it is to be understood that additional brackets may be installed on either side of the pipe hanger as necessary.

Figure 4:
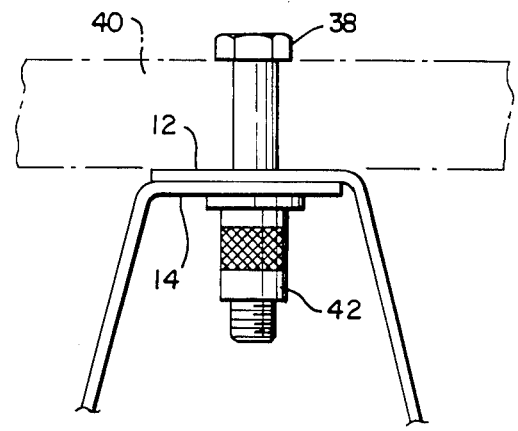
FIG. 4 is a partial front view showing the overlapping end portions of the hanger of FIG. 1.
Figure 2:
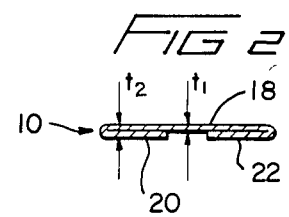
FIG. 2 is a cross-sectional view taken along line A—A in FIG. 1.
Figure 3:
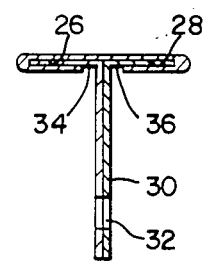
FIG. 3 is a cross-sectional view taken along line B—B in FIG. 1.

As illustrated in FIG. 4, a bolt 38 or the like extends through support structure 40 and through aligned openings in the end portions 12 and 14. A knurled nut 42 or other means is threaded onto the bolt 38 so as to retain the hanger on the support structure.

Figure 5:
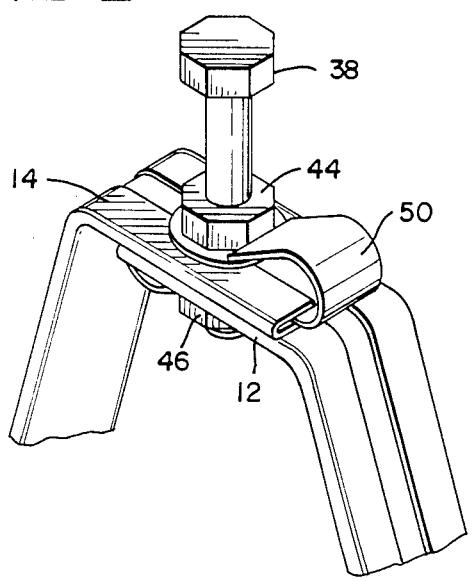
FIG. 5 is a partial perspective view showing a nut lock device associated with the hanger strap according to the invention.
Figure 6:
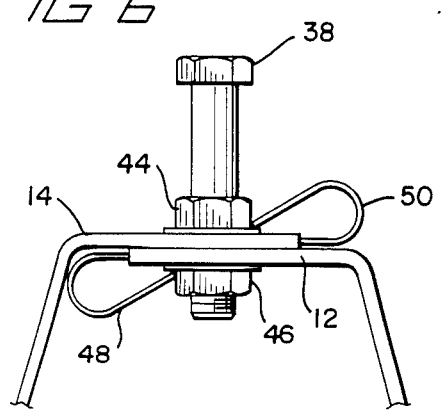
FIG. 6 is a partial front view showing the nut lock devices of FIG. 5.

Nuts 44 and 46 may be located on either side of the overlapping end portions as illustrated in FIGS. 5 and 6. Nut locking members 48 and 50 may be inserted into the laterally extending slots 26 and 28 at the ends of overlapping portions 12 and 14, respectively. The nut locking members may be manually deformed after the nuts 44 and 46 have been installed so as to bear against one of the flats to prevent their inadvertent rotation with respect to the hanger.

Figure 7:
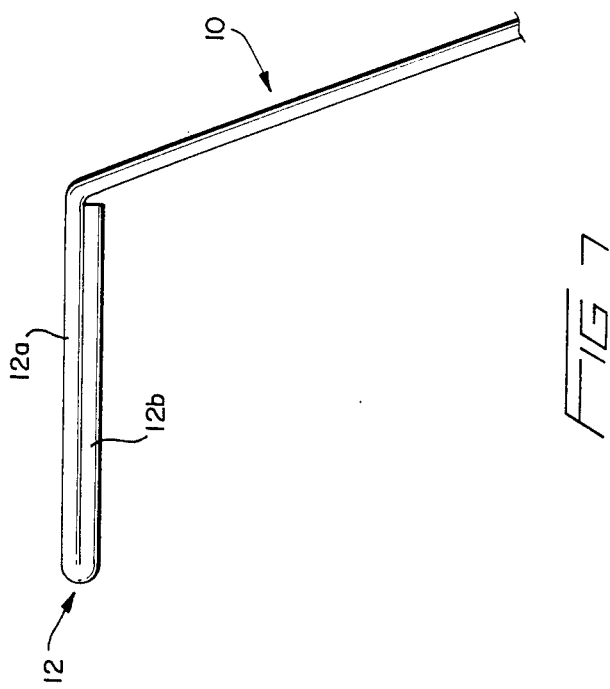
FIG. 7 is a partial front view showing an alternative embodiment of an end portion of the hanger strap.
Figure 8:
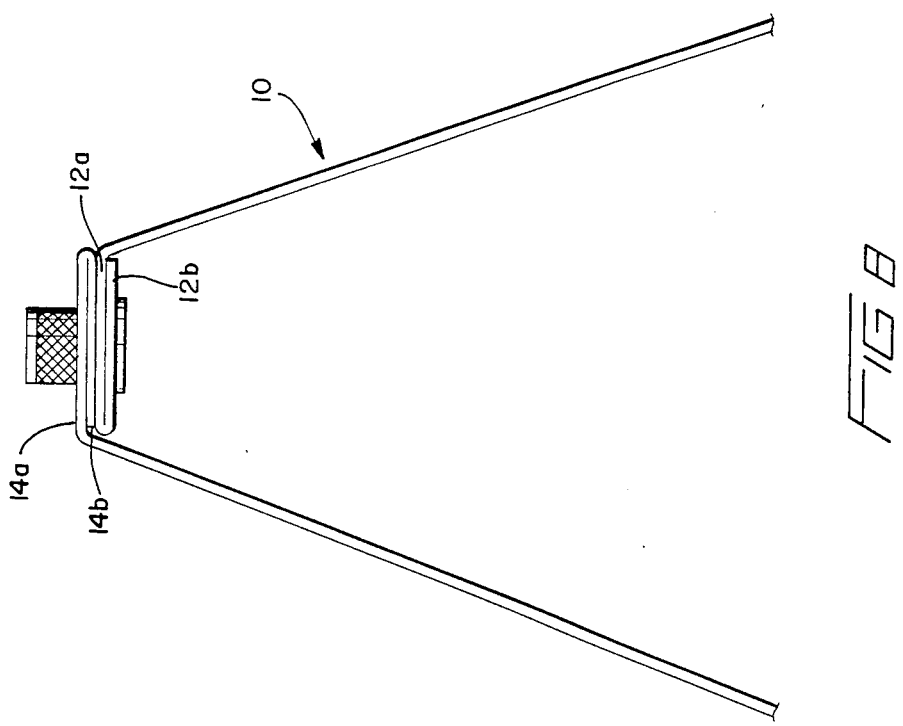
FIG. 8 is a partial, front view showing the overlapping end portions according to the embodiment of FIG. 7.

An alternative embodiment for the overlapping end portions 12 and 14 is shown in FIGS. 7 and 8. In this embodiment, each of the end portions has a first part 12a and 14a, respectively and a second part 12b and 14b. The second parts 12b and 14b are folded over onto the first parts 12a and 14a so as to form double thickness reinforced end portions. When the end portions are overlapped, as shown in FIG. 8, the mounting bolt passes through four thicknesses to provide additional reinforcement for the hanger at its attachment point. This reinforces the attachment point of the hanger without the necessity of increasing the size or weight of the remainder of the hanger structure. The remainder of the elongated strap member 10 is identical to the embodiment previously and may be utilized with a lateral bracing bracket and the nut locking members as described.

Figure 9:
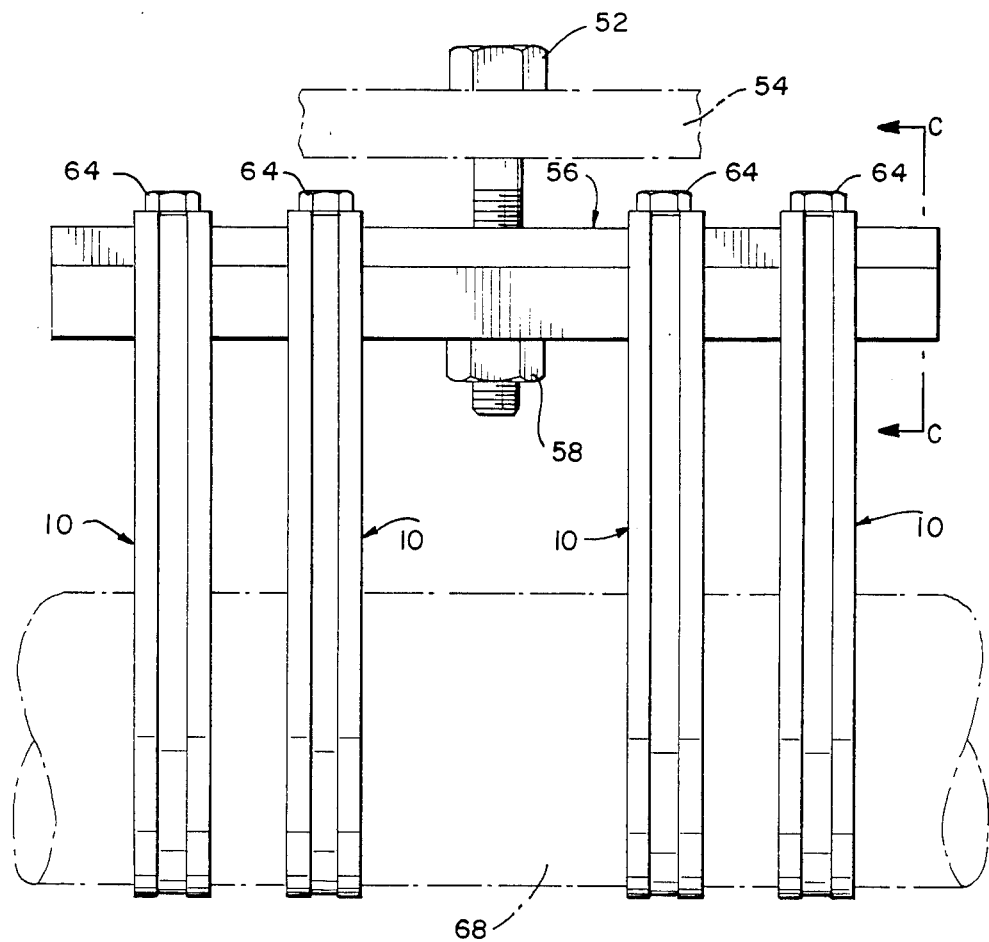
FIG. 9 is a side view of a multiple hanger apparatus.
Figure 10:
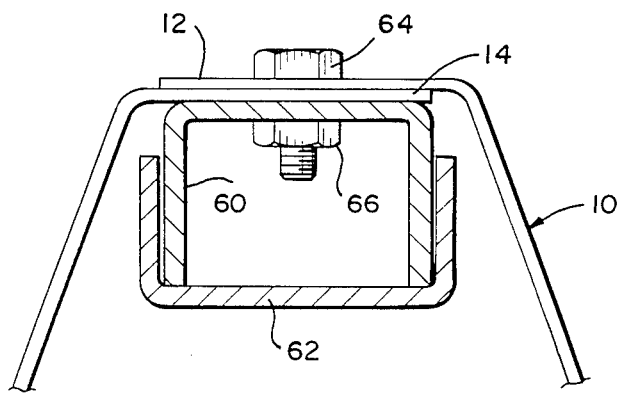
FIG. 10 is a cross-sectional view taken along line C—C in FIG. 9.

FIGS. 9 and 10 illustrate a device for utilizing multiple strap members 10. As in the previously described embodiments, a bolt 52 or the like extends through a support structure 54 and has mounting bar assembly 56 attached thereto by a nut 58. Mounting bar assembly 56 comprises a first member 60 having a generally inverted "U" shaped cross section and a second member 62 having a generally "U" shaped cross section. Members 60 and 62 define aligned openings to facilitate the passage therethrough of bolt 52 to retain the members in assembled relationship.

A plurality of strap members 10 are attached to member 60 via bolts 64 and nuts 66, as shown in FIG. 10. Each of the strap members 10 passes under pipe 68 so as to support it from structure 56. Although four hanger strap members 10 are illustrated in FIG. 9, it is to be understood that more or less may be utilized on assembly 56 depending upon the load requirements at the individual job site.

Figure 11:
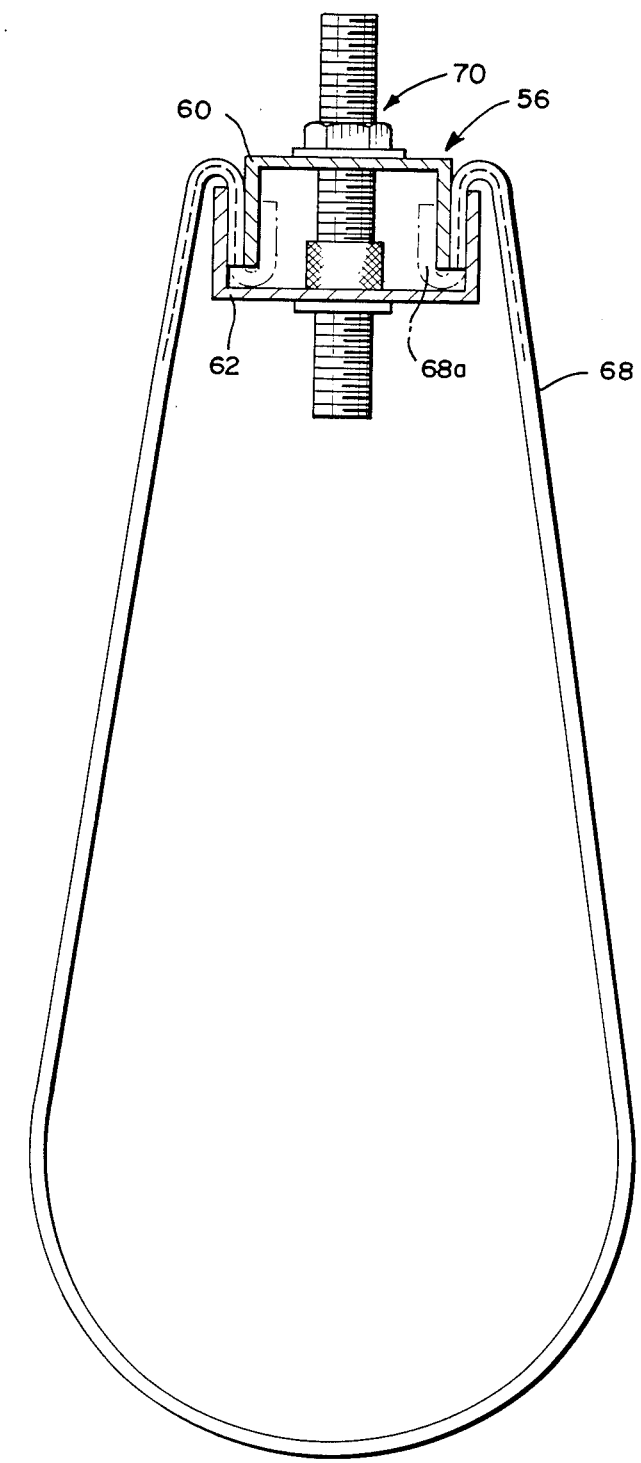
FIG. 11 is a front cross-sectional view of an alternative embodiment viewed along line C—C in FIG. 9.

FIG. 11 illustrates an alternative embodiment of the hanger strap members that may be used with mounting bar assembly 56 shown in FIGS. 9 and 10. The end portions of strap members 68 do not overlap as in the previously described embodiments, but are bent downwardly so as to extend between first and second members 60 and 62, respectively.

The end portions may also extend around the lower edges of first member 60 and be further bent upwardly as illustrated at dotted portion 68a in FIG. 11.

A stud or bolt and nut assembly 70 extends through first and second members 60 and 62 so as to fasten them together such that first and second end portions are clamped between members 60 and 62.

The foregoing is provided for illustrative purposes only and should not be construed as in any way limiting this invention, the scope of which is defined solely by the appended claims.

What is claimed is:

1. A pipe hanger comprising:
   (a) an elongated non-elastic strap member having: (i) a base portion extending substantially the entire length of the strap member, the base portion having first and second end portions, and a thickness of $t_1$; and (ii) lateral edge portions having a thickness of $t_2$ such that $t_2 > t_1$; and,
   (b) attaching means to attach the end portions to a support structure such that the elongated strap member extends around at least a portion of the pipe periphery so as to support the pipe from the structure.

2. The pipe hanger according to claim 1 wherein $t_2$ is at least twice $t_1$.

3. The pipe hanger according to claim 1 wherein the lateral edge portions define a central gap therebetween.

4. The pipe hanger according to claim 3 wherein the lateral edge portions define lateral slots extending outwardly from and communicating with the central gap.

5. The pipe hanger according to claim 4 further comprising bracket means attached to the elongated strap member and extending therefrom.

6. The pipe hanger according to claim 5 wherein the bracket means comprises:
   (a) an attaching portion; and,
   (b) at least one flange extending from the attaching portion into at least one of the lateral slots of the lateral edge portions.

7. The pipe hanger according to claim 6 wherein the at least one flange is dimensioned to be slidably received in the at least one lateral slot.

8. The pipe hanger according to claim 1 wherein the lateral edge portions extent substantially the entire length of the elongated strap member.

9. The pipe hanger according to claim 8 wherein $t_2$ is at least twice $t_1$.

10. The pipe hanger according to claim 9 wherein the lateral edge portions define a central gap therebetween.

11. The pipe hanger according to claim 10 wherein the lateral edge portions define lateral slots extending outwardly from and communicating with the central gap.

12. The pipe hanger according to claim 11 further comprising bracket means attached to the elongated strap member and extending therefrom.

13. The pipe hanger according to claim 12 wherein the bracket means comprises:
   (a) an attaching portion; and,
   (b) at least one flange extending from the attaching portion into at least one of the lateral slots of the lateral edge portions.

14. The pipe hanger according to claim 13 wherein the at least one flange is dimensioned to be slidably received in the at least one lateral slot.

15. The pipe hanger according to claim 1 wherein the attaching means comprises a mounting bar and fastening means to fasten the mounting bar to a support structure.

16. The pipe hanger according to claim 15 further comprising a plurality of elongated strap members attached to the mounting bar.

17. The pipe hanger according to claim 1 wherein each end portion comprises a first part and a second part, the second part folded over onto the first part to serve a reinforcement of the end portion.

18. The pipe hanger according to claim 11 wherein the first and second end portions overlap.

19. The pipe hanger according to claim 15 wherein the mounting bar comprises:
   (a) a first member having a generally inverted "U" shaped cross-section;
   (b) a second member having generally "U" shaped cross-section and extending generally parallel to the first member;
   (c) first fastening means to fasten the first and second members to a support structure; and,
   (d) second fastening means to fasten the elongated strap members to the first member.

20. The pipe hanger according to claim 19 wherein the first and second end portions of the elongated strap member overlap.

21. The pipe hanger according to claim 20 wherein the second fastening means extends through the first member and the overlapping end portions.

22. The pipe hanger according to claim 15 wherein the mounting bar comprises:
   (a) a first member;
   (b) a second member extending generally parallel to the first member; and
   (c) means to fasten the first and second members together such that first and second end portions of the elongated strap member are clamped therebetween.

23. The pipe hanger according to claim 22 wherein the first member has a generally inverted "U" shaped cross-sectional shape.

24. The pipe hanger according to claim 23 wherein the second member has a generally "U" shaped cross-sectional shape.

25. The pipe hanger according to claim 18 wherein the attaching means comprises:
   (a) bolt means adapted to be connected with the support structure and passing through the first and second overlapping end portions; and,
   (b) nut means threadingly engaged with the bolt means.

26. The pipe hanger according to claim 25 further comprising nut locking means attached to the elongated strap member and adapted to contact the nut means so as to prevent rotation thereof.

27. The pipe hanger according to claim 26 wherein the nut locking means is attached to the elongated strap member by engagement of the nut locking means with the at least one lateral slot.

* * * * *